United States Patent [19]

Messner

[11] 3,755,105

[45] Aug. 28, 1973

[54] VACUUM ELECTRICAL CONTACTS FOR USE IN ELECTROLYTIC CELLS

[76] Inventor: Georg Messner, Latemar Strasse 7, Munich, Germany

[22] Filed: June 28, 1971

[21] Appl. No.: 157,380

[52] U.S. Cl. ...................... 204/95, 204/99, 204/128, 204/250, 204/256, 204/268, 204/286, 204/297 M

[51] Int. Cl. ............................................ C01b 11/26

[58] Field of Search .................... 204/250, 256, 268, 204/270, 278, 286, 297 R, 95, 99, 128

[56] References Cited

UNITED STATES PATENTS

| | | | |
|---|---|---|---|
| 3,337,443 | 8/1967 | Raetzsch et al. | 204/254 |
| 3,481,858 | 12/1969 | Fromson | 204/279 R |
| 3,536,594 | 10/1970 | Pritchard | 204/297 R |
| 3,547,799 | 12/1970 | Schucker et al. | 204/297 R |
| 3,441,495 | 4/1969 | Colman | 204/268 |
| 3,242,065 | 3/1966 | DeNora et al. | 204/256 |
| 3,499,829 | 3/1970 | Messner et al. | 204/250 |
| 3,461,838 | 8/1969 | Nelson, Jr. et al. | 204/297 R |
| 3,318,792 | 5/1967 | Cotton et al. | 204/286 |
| 3,598,715 | 8/1971 | Goens et al. | 204/278 |

*Primary Examiner*—John H. Mack
*Assistant Examiner*—W. I. Solomon
*Attorney*—Hammond & Littell

[57] ABSTRACT

Electrical contact is made between two electronic conductors by applying a vacuum on the spaces between the said electronic conductors, particularly useful when the conductors are made of different materials, and are used as mono and bipolar connectors in electrolysis cells, and method of making good electrical connections between two metals.

9 Claims, 12 Drawing Figures

INVENTOR
GEORG MESSNER
BY
Hammond & Littell
ATTORNEYS

INVENTOR
GEORG MESSNER
BY
Hammond & Littell
ATTORNEYS

INVENTOR
GEORG MESSNER
BY
Hammond & Littell
ATTORNEYS

INVENTOR
GEORG MESSNER
BY
Hammond & Littell
ATTORNEYS

INVENTOR
GEORG MESSNER
BY
ATTORNEYS

INVENTOR
GEORG MESSNER
BY
ATTORNEYS

INVENTOR
GEORG MESSNER
BY
ATTORNEYS

INVENTOR
GEORG MESSNER
BY
Hammond & Littell
ATTORNEYS

VACUUM ELECTRICAL CONTACTS FOR USE IN ELECTROLYTIC CELLS

STATE OF THE ART

There are many instances where electrical contacts between two electronic conductors whether of the same material or not must be provided. The problem has been to obtain as good an electrical contact as possible between the two conductors to avoid loss of electrical energy, to solve the problem of creep between dissimilar metals and to solve other problems such as corrosion on the interface between the two conductors. For instance, in electrolysis cells wherein chlorine is produced, base metals such as iron which are subject to attack by chlorine may be protected with a sheath of protective metal such as titanium. In bipolar cells, atomic hydrogen may pass through the iron catholyte compartments and into the anolyte compartments and attack the titanium lining of the anodic compartments.

To reduce the amount of expensive metals, such as nickel, silver, stainless steel, tantalum, tungsten, titanium, platinum metals, etc., the expensive metals are applied to a cheaper base metal such as iron or steel, etc. The electrical connections between the base metal and the expensive metal are not usually good enough. Hot rolling cladding processes for joining the expensive metal and the base metal are not useful because brittle intermetallic phases are formed.

Explosion cladding has been proposed for joining two such metals, but this process is expensive and not satisfactory. Moreover, clad materials generally become distorted when subject to temperature changes because the two metals have different coefficients of expansion and creep relative to each other. The clad metals cannot move with respect to one another and, therefore, the bond or connection between the two metals must either rupture or one or both of the metals is distorted to compensate for the different thermal expansions.

In some situations, the connection between the two electronic conductors needs to be only temporary such as where one of the two is subject to wear or other corrosions and needs periodic replacing. For example, in a horizontal mercury cell for the electrolysis of brine to chlorine, the cathode is a thin layer of mercury flowing on a slightly sloped steel plate which forms the cell bottom. The surface of the said plate has to be accurately machined to obtain an even surface to keep the entire plate covered with the thin layer of mercury to avoid hydrogen evolution. After prolonged operation of the cell, the steel plate loses its original smoothness due to abrasion of the flowing mercury layer and occasional chemical attack during shutdown operations, when the mercury stream is disrupted. Therefore, the top steel is preferably replaced by a new sheet or is covered over with a new sheet held in electrical contact with the steel bottom by means of a vacuum, which avoids the use of cladding techniques unless the entire cell is to be dismantled, which is impractical.

In bipolar electrolyzers having a plurality of anodes and cathodes working in parallel in each electrolyzer element, the presence of atomic hydrogen which is evolved in the electrolysis reaction causes serious problems by passing through the ferrous metal cathode compartment walls and attacking the titanium metal which is used in the anode construction or to line the anode compartments. The hydrogen atoms which are produced at the steel cathode tend to migrate through the steel cathode of one cell element into the titanium, tantalum or other valve metal of the anodes of the adjacent element which destroys the valve metal by formation of titanium, tantalum or other hydride.

OBJECTS OF THE INVENTION

It is an object of the invention to provide an easily broken electrical contact between two electronic conductors whether made of the same or different materials.

It is another object of the invention to provide two electrically connected electronic conductors in an electrolysis cell which are maintained in electrical contact by maintaining a vacuum on the space surrounding and between the contacting surfaces of the said conductors.

It is a further object of the invention to provide an electrical connection between two electronic conductors in an electrolysis cell, which connection can be easily broken without damage to the conductors.

These and other objects and advantages of the invention will become obvious from the following detailed description.

THE INVENTION

The novel electrical connection of the invention is comprised of two electronic conductors in an electrolysis cell in contact with each other, in which the surfaces in contact are maintained in contact by creating a vacuum on the surrounding areas to insure optimum electrical contact. The contacting surfaces of the electronic conductors are preferably coated with a relatively soft metal, either continuously or discontinuously, such as metal stripes, dots or rectangular waves to insure as complete surface contact as possible for the surfaces intended to be kept in contact.

The two electronic conductors to be contacted may be made of the same or different materials. The invention is particularly advantageous for contacting metals of different thermal expansions in an electrolysis cell such as a base made of inexpensive material such as iron or steel with an expensive metal such as nickel, silver, stainless steel or a valve metal, such as tantalum, titanium or tungsten, etc. The vacuum contact is an improvement over the forming of clad materials subject to temperature changes as the vacuum contact will be maintained, while permitting the two conductors to move with respect to one another to compensate for differences in thermal expansion, and bending and/or rupture of the contact of the materials is avoided.

The contacting surfaces of the two electronic conductors should, of course, be cleaned by conventional mechanical or chemical cleaning means. After the cleaning, it is preferred to coat one or both contacting surfaces with a thin layer, i.e., 1 to 3 mm, of a soft, electrically conductive metal such as copper, silver, lead, tin or any suitable alloy. The said thin layer can be applied by any conventional method, but is preferably applied by a spray gun or plasma jet. The coating is preferably continuous, but may be discontinuous, such as stripes or polka dots, etc.

Instead of a coating on one or both contacting surfaces, it may in some cases be more useful to put a more or less loose sheet of a conductive soft metal between the contacting surfaces. This soft metal sheet may be a full sheet or a partially interrupted sheet or a woven screen or net of a soft metal or one or more different soft metals or a soft metal cloth.

The vacuum contact of electronic conductors of the invention has wide application in diverse fields. One of the useful areas of application is in providing good electrical contacts in electrolysis cells. Good electrical contact is required in these cells as they use high current densities and the reduction in internal resistance loss results in substantial savings, particularly for the electrolysis of brines in horizontal mercury cells or mono and bipolar electrolysis cells, and diaphragm cells for the production of chlorine and caustic soda, other alkali metal hydroxides, the production of alkali metal chlorates, hypochlorites, etc.

In horizontal mercury cells, the cathode is a thin layer of mercury flowing on a slightly sloped steel plate which forms the cell bottom. The surface of the steel plate must be accurately machined to allow a smooth, unbroken flow of mercury. After prolonged cell operation, the steel plate tends to lose its original smoothness due to the abrasive action of the flowing mercury or amalgam, chemical attack by the chlorinated brine wherever it accidentally contacts the steel bottom and/or chemical attack during shutdown operations when the mercury flow is halted and brine or other solutions come into contact with the steel plate.

The steel bottom will gradually become rough and the original smoothness can be practically returned only by conventional machining methods. Moreover, this would require complete dismantling of the cell which is usually 50 to 60 feet long and transportation of the huge and very heavy steel plate to a work shop with adequate facilities.

These problems can be overcome by simply placing a separate, relatively thin metal sheet made of any suitable material, such as nickel, stainless steel or monel alloy over the old steel plate bottom and applying a vacuum on the space between the metal sheet and steel plate bottom.

Referring now to the drawings:

FIG. 1*a* is a vertical cross sectional view of a flowing mercury electrolysis cell with dimensionally stable anodes, and FIG. 1*b* is an enlarged view of one side of the cell of FIG. 1*a*, showing the sealing and vacuum connections;

FIG. 2*a* is a cross sectional view of a plurality of bipolar mercury electrolysis cells provided with dimensionally stable anodes, and FIG. 2*b* is an enlarged view of one side of the plurality of cells of FIG. 2*a;*

Figures 6, 6A:
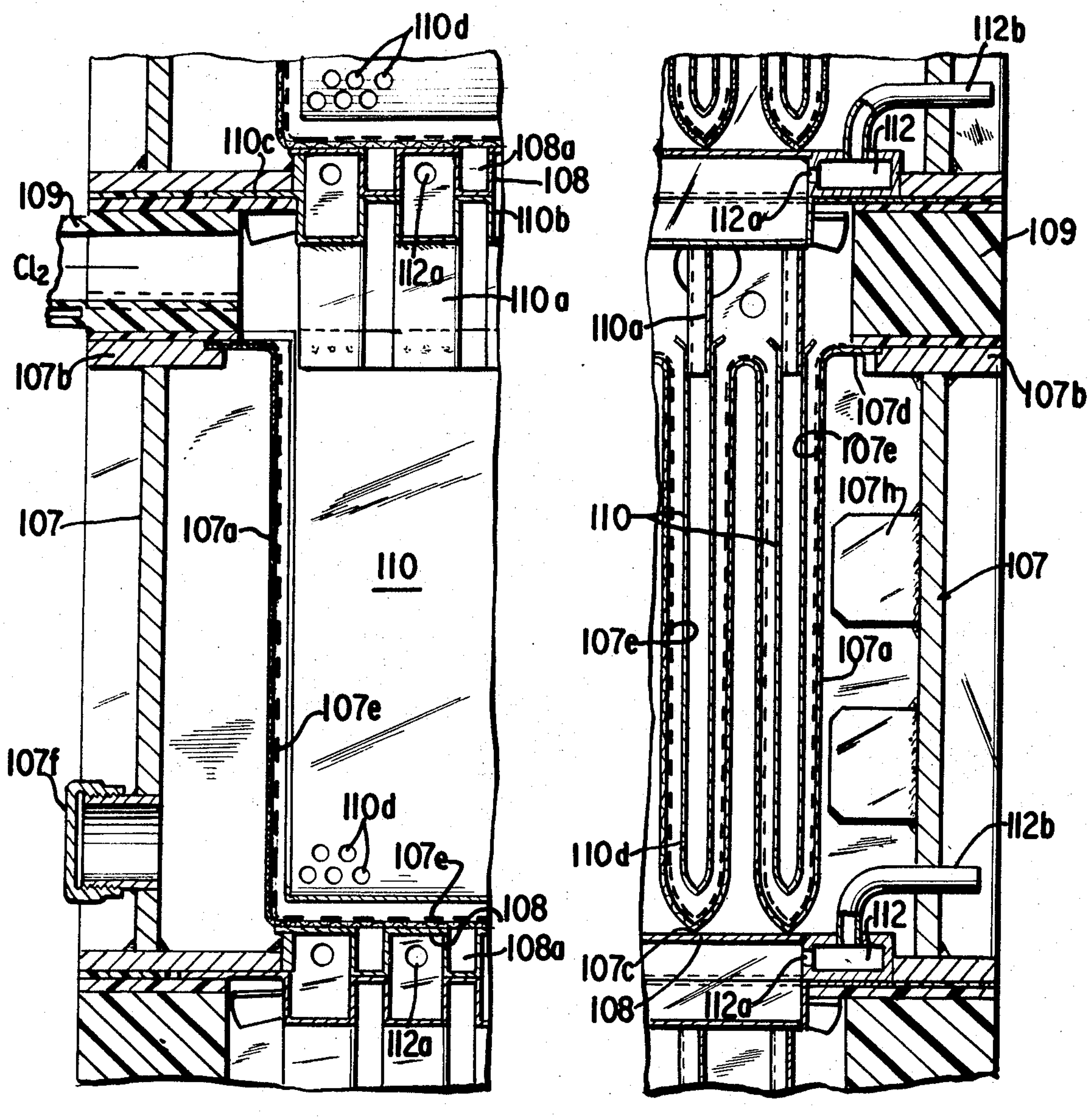
Figure 7:
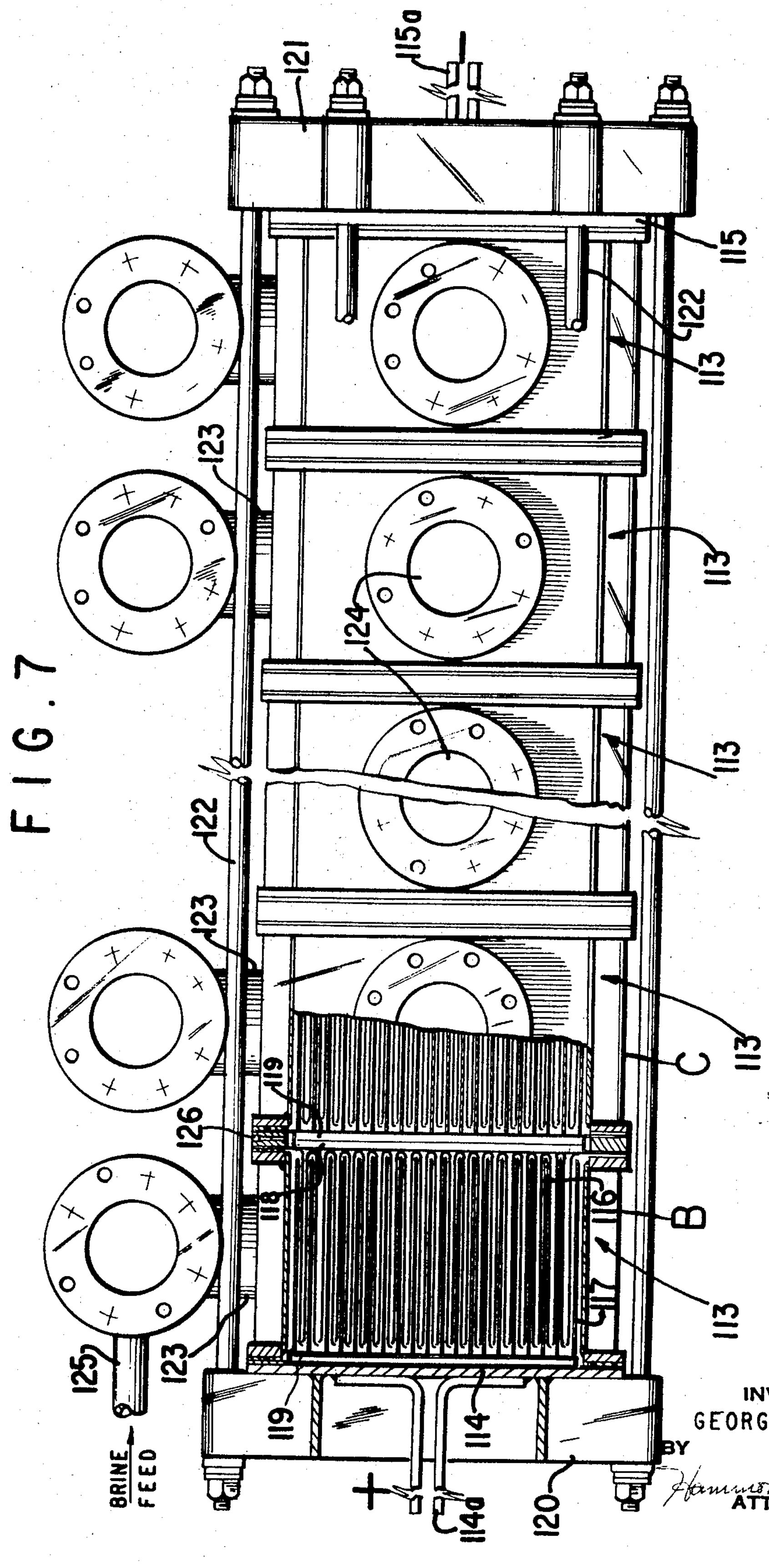
Figure 8:
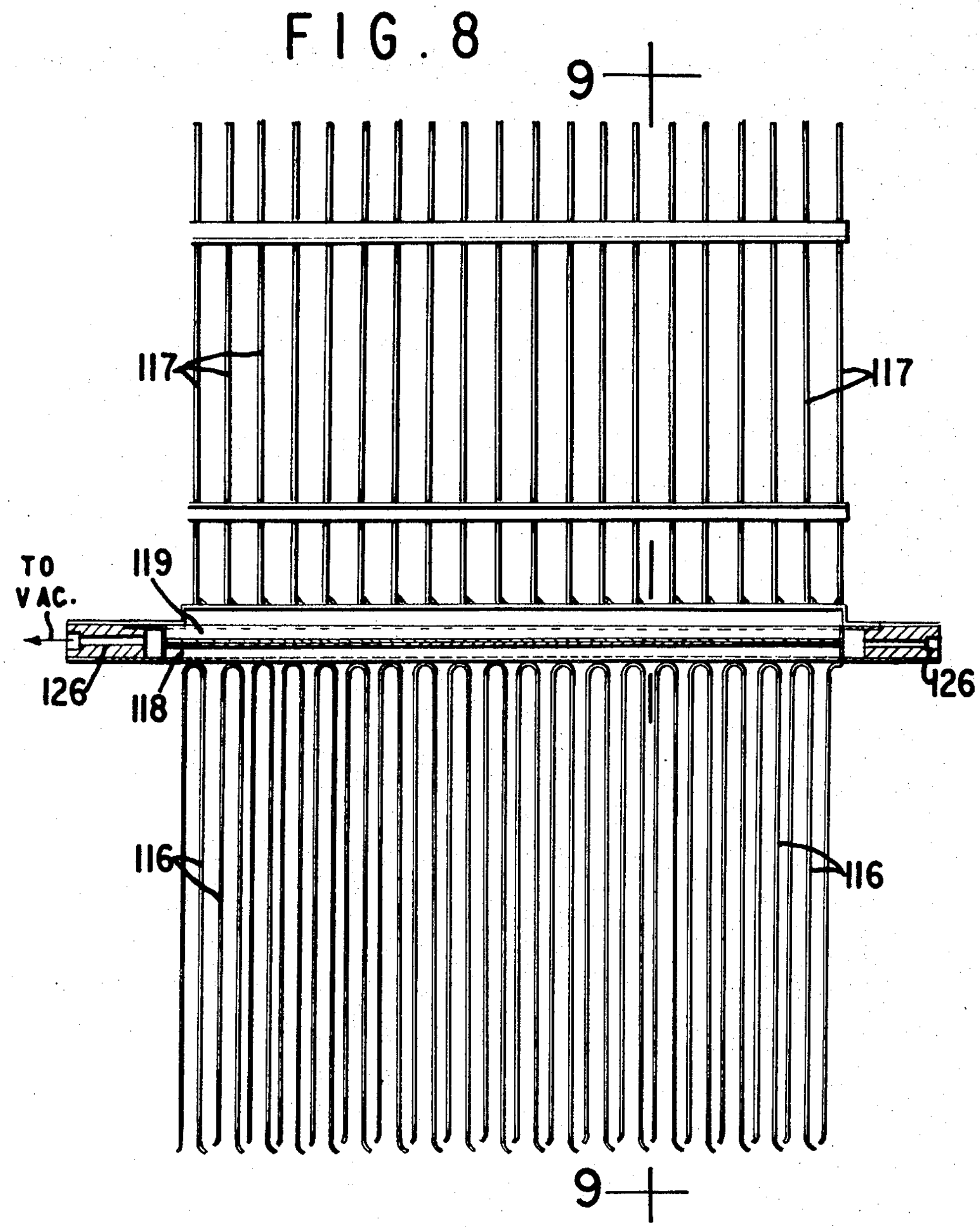
Figure 9:
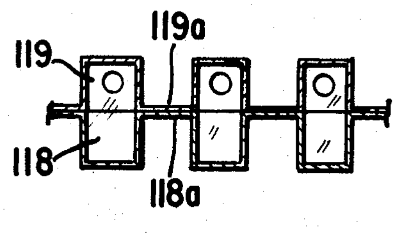

FIGS. 6 and 6*a* are enlarged partial sectional views of two anode double blades and two cathode waves of a cell unit, in which FIG. 6*a* is taken at a right angle to FIG. 6;

FIG. 7 is a partial plan view of a bipolar chlorate cell;

FIG. 8 is a partial cross section of the anodes of a cell element and the cathodes of the adjacent cell element of the chlorate cell of FIG. 7; and FIG. 9 is a cross sectional view along the line 9—9 of FIG. 8.

Figure 1A:
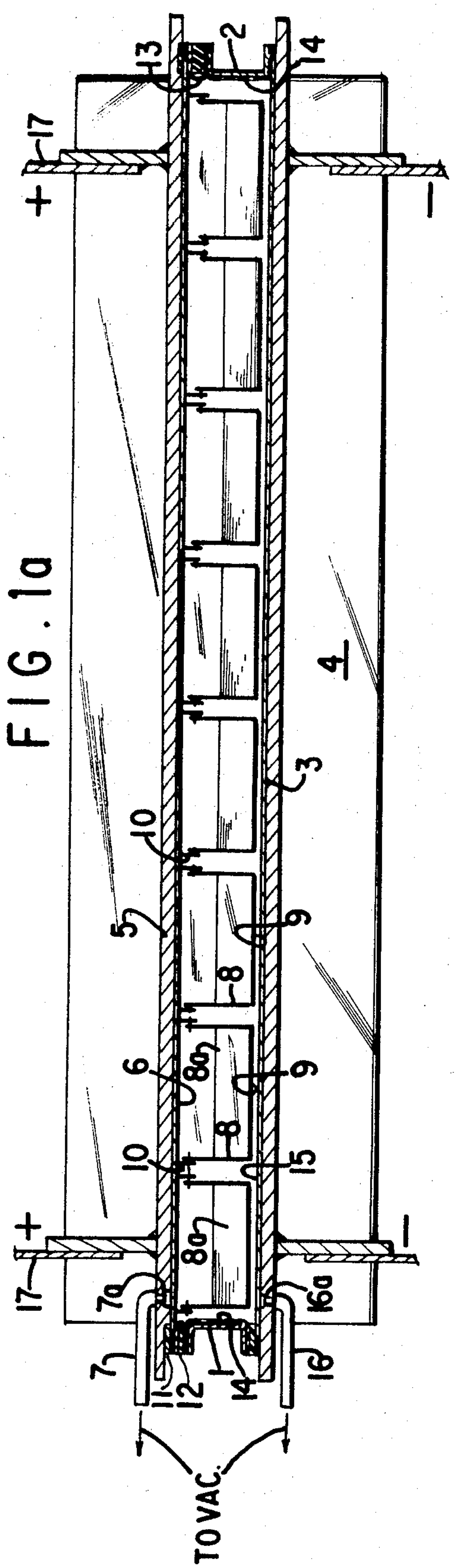
Figures 1B, 2B:
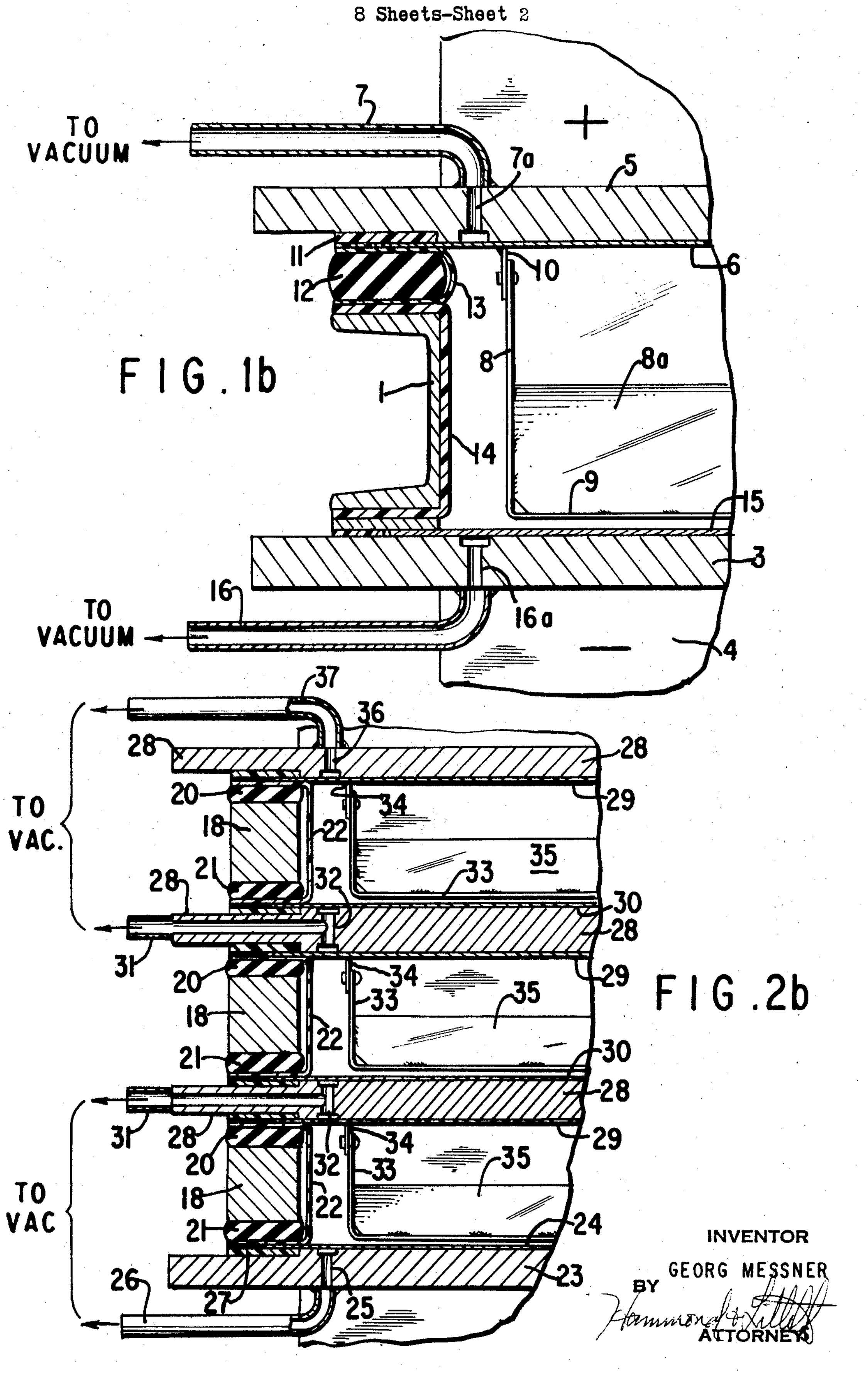

In FIGS. 1*a* and 1*b*, the cell is comprised of side walls 1 and 2 and a steel bottom 3 and the cell is supported on supports 4 to which the negative connection to a power source is made. The cell is provided with a steel cover 5 having a thin titanium lining sheet 6, about 1 to 1.5 mm thick, on the inner side thereof. The positive terminals 17 of the power source are connected to the top plate 5. The titanium sheet 6 and steel cover 5 are held in electrical contact with each other by a vacuum applied through connection 7. The dimensionally stable anodes 8 are made of thin titanium mesh or sheet, having a catalytically active coating on the active face 9 and are bolted to the titanium sheet 6 through titanium brackets 10. The anodes are reinforced by titanium plates 8*a*. The contacting faces of the sheet 6 and cover 5 are preferably sprayed with copper, tin or lead.

The titanium sheet 6 on the lower face of steel cover 5 avoids the complicated current connections for the anodes of the prior art, which required electrical lead-ins passing through the cover which had to be shielded from the chlorine evolved in the cell and which resulted in current loss. In the embodiment of FIGS. 1*a* and 1*b*, the current can be passed through terminals 17 and steel cover 5 into titanium sheet 6, held in vacuum electrical connection with the sheet 5, and brackets 10 to the anodes 8, then through the elctrolyte and flowing mercury cell bottom. If the cell has to be disassembled, the titanium sheet with the anodes attached is separated from the steel cover 5 by breaking the vacuum.

The exact adjustment of the gap between the active anode face and the flowing mercury cathode is effected by adjusting electrically insulated external clamps or bolts (not shown) which can press the steel cover down towards the steel bottom until the desired gap is achieved. This is provided in the illustrated embodiment by a soft rubber gasket 11 between the edge of the steel cover 5 and the titanium sheet 6 and a relatively thick, soft rubber gasket 12 between the titanium sheet 6 and side walls 1. The external pressure will squeeze the gasket 12, so that the distance between the sheet 6 and base 3 will lessen. The gasket 12 is protected from chlorine attack by a loose sheet of Teflon 13 or some other chlorine resistant flexible material. If the side wall 1 is made of a material subject to chlorine attack, it can be provided with a titanium, a hard rubber or other protective lining 14.

The steel bottom 3 is provided with a removable inserted bottom sheet 15, 1 to 2 mm thick, made of an appropriate metal such as nickel, monel or stainless steel which is held in electrical contact with steel bottom 3 by a vacuum applied through connection 16. The vacuum connections 7 and 16 are attached to the cover 5 and bottom 3, respectively, where bore holes 7*a* and 16*a* pass therethrough to connect with the space between the top 5 and sheet 6 and the bottom 3 and sheet 15, whereby the air between sheets 6 and 15 and cover 5 and bottom 3, respectively, can be evacuated and these parts held in good electrical contact by vacuum between said parts and the air pressure on the sheets 6 and 15.

This avoids the necessity of machining the entire steel bottom when it becomes roughened too much by the flowing mercury. The cell is merely opened and the vacuum on connection 16 is disrupted and sheet 15 is removed and replaced with a new sheet.

Figure 2A:
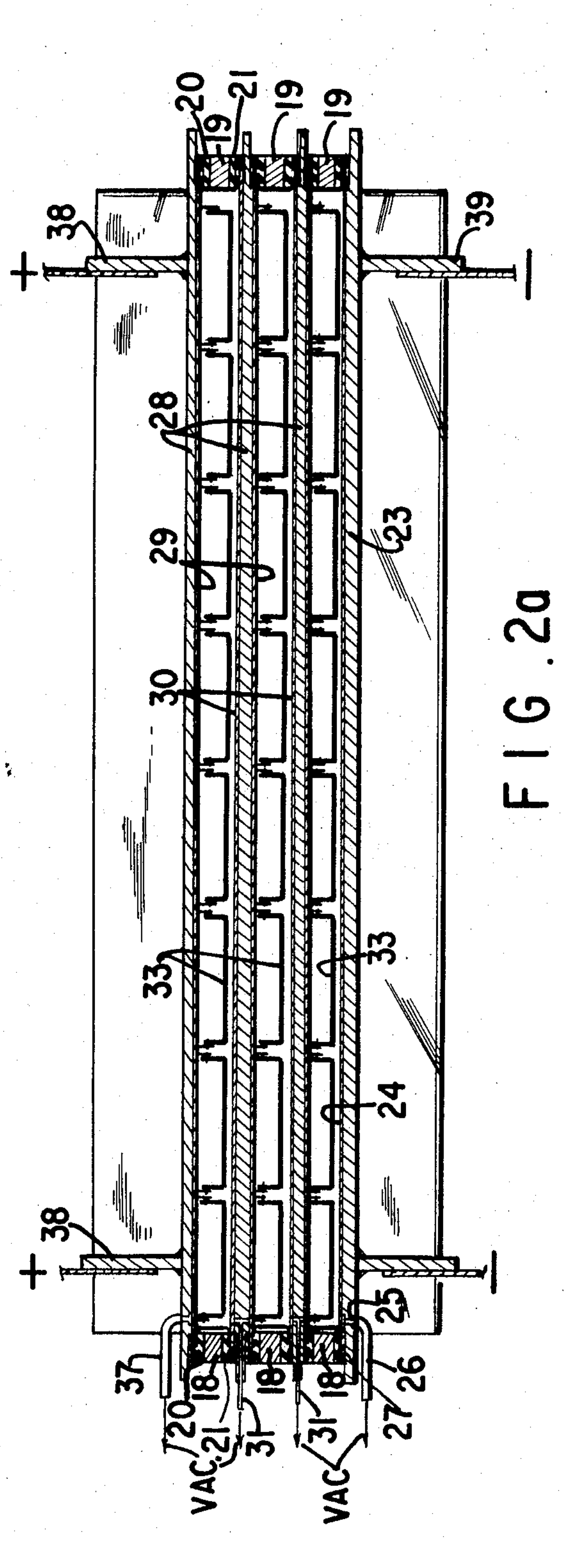

The electrolysis unit of FIGS. 2*a* and 2*b* is comprised of a series of bipolar mercury electrolysis cell units stacked one upon another and in direct bipolar electrical contact with one another so the current will pass from the cathode base of one cell to the anodes of the next lower cell unit. The embodiment illustrated reduces the capital investment and labor costs for the assembly and disassembly of multi-tier units as the hundreds of connections and gaskets and the resulting problems connected with the failure of a prior art single cell are avoided.

Basically, the bipolar cell unit consists of a plurality of cell units similar to that illustrated in FIGS. 1*a* and 1*b*, wherein the cover of the bottom cell acts as the bottom plate for the cell directly above. Each cell unit is comprised of steel side frames 18 and 19 with soft rubber gaskets 20 and 21 on top and below the steel frame which forms the side walls, and the gaskets and steel side frames are protected on the top, bottom and interior face by a flexible Teflon or other protective sheet 22. The cell bottom of the lowest or bottom cell is formed by a steel plate 23 having thereover a thin sheet 24 of nickel, stainless steel, monel metal or other appropriate metal, held in vacuum connection therewith. The vacuum is applied to the space between plate 23 and sheet 24 through bore 25 and connection 26 in the steel plate 23. A soft rubber gasket 27 is provided between the end of plate 23 and sheet 24.

The cover for the lowest bottom cell acts as the bottom plate for the cell directly above and is comprised of a steel plate 28 provided with a thin titanium sheet 29 on the lower side thereof and a thin steel or nickel sheet 30 on the upper side. Metal sheets 29 and 30 are held in electrical connection with steel plates 28 by a vacuum applied to connection 31 which is connected to vertical bore 32 passing through the steel plates 28.

The dimensionally stable anodes 33 are connected to titanium sheet 29 by bolting or welding to brackets 34 and the anodes 33 may be stiffened by titanium reinforcement strips 35 as shown in FIG. 2*b*. The cover for the uppermost or top cell unit is the same, except that there is no steel sheet 30 on the upper side and the vacuum is applied to the space between the steel plate 28 and titanium sheet 29 through bore 36 and connection 37.

Again, the electrolysis gap between anodes 33 and the flowing mercury cathode can be adjusted by pressing, preferably individually, the cover and the steel bottom of each unit together, which will move closer together by deformation of the soft rubber gaskets 20 and 21, suitable clamps (not shown) are provided for holding the anodes and cathodes in the desired adjusted position. The electrical current is introduced through terminals 38 on the cover of the top cell unit and the negative connection is made to terminals 39.

Figure 3:
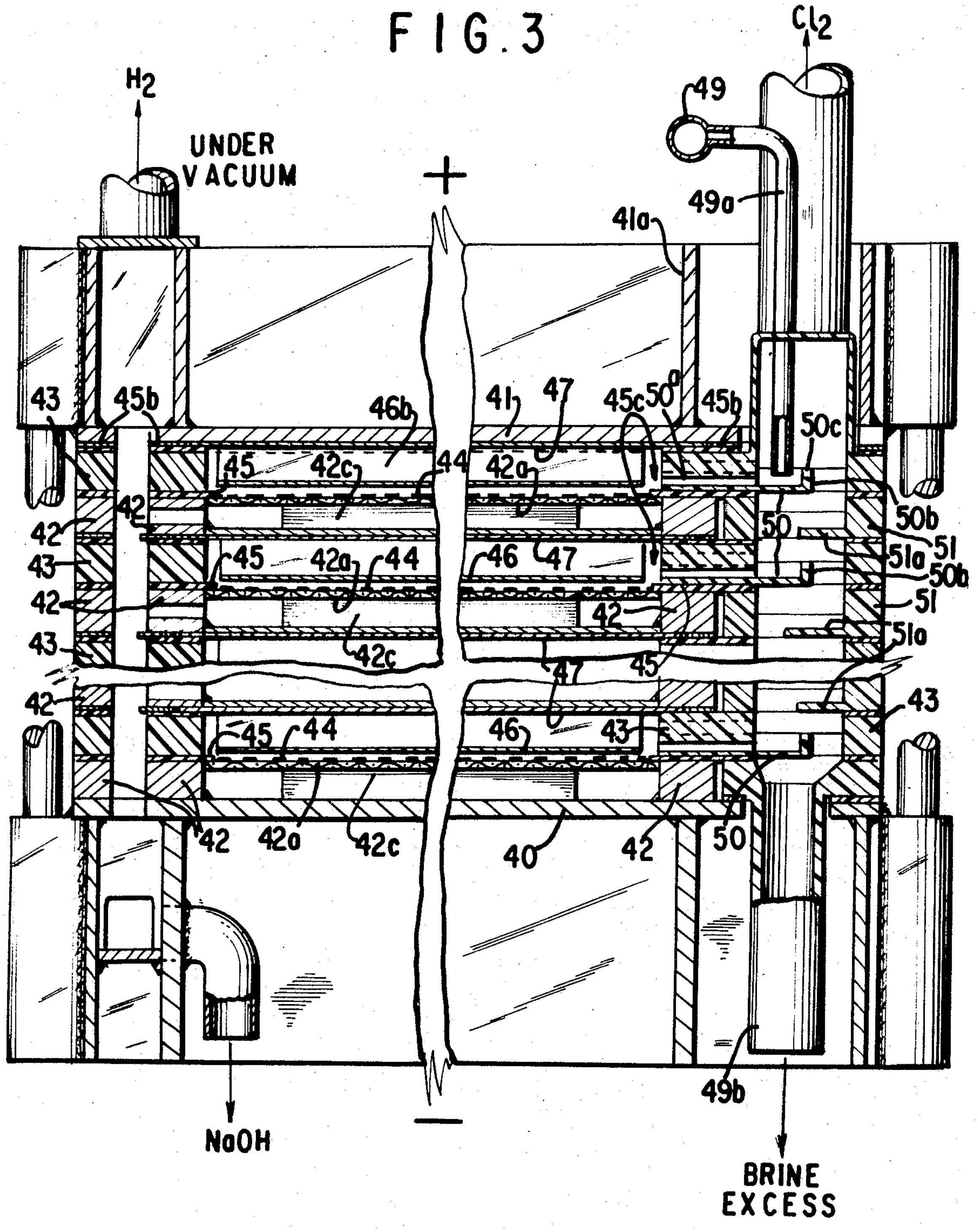
FIG. 3 is an enlarged detail of the right and left sides of several cell sections of a stacked bipolar diaphragm cell with the anodes, cathodes and diaphragms in horizontal planes.
Figure 4:
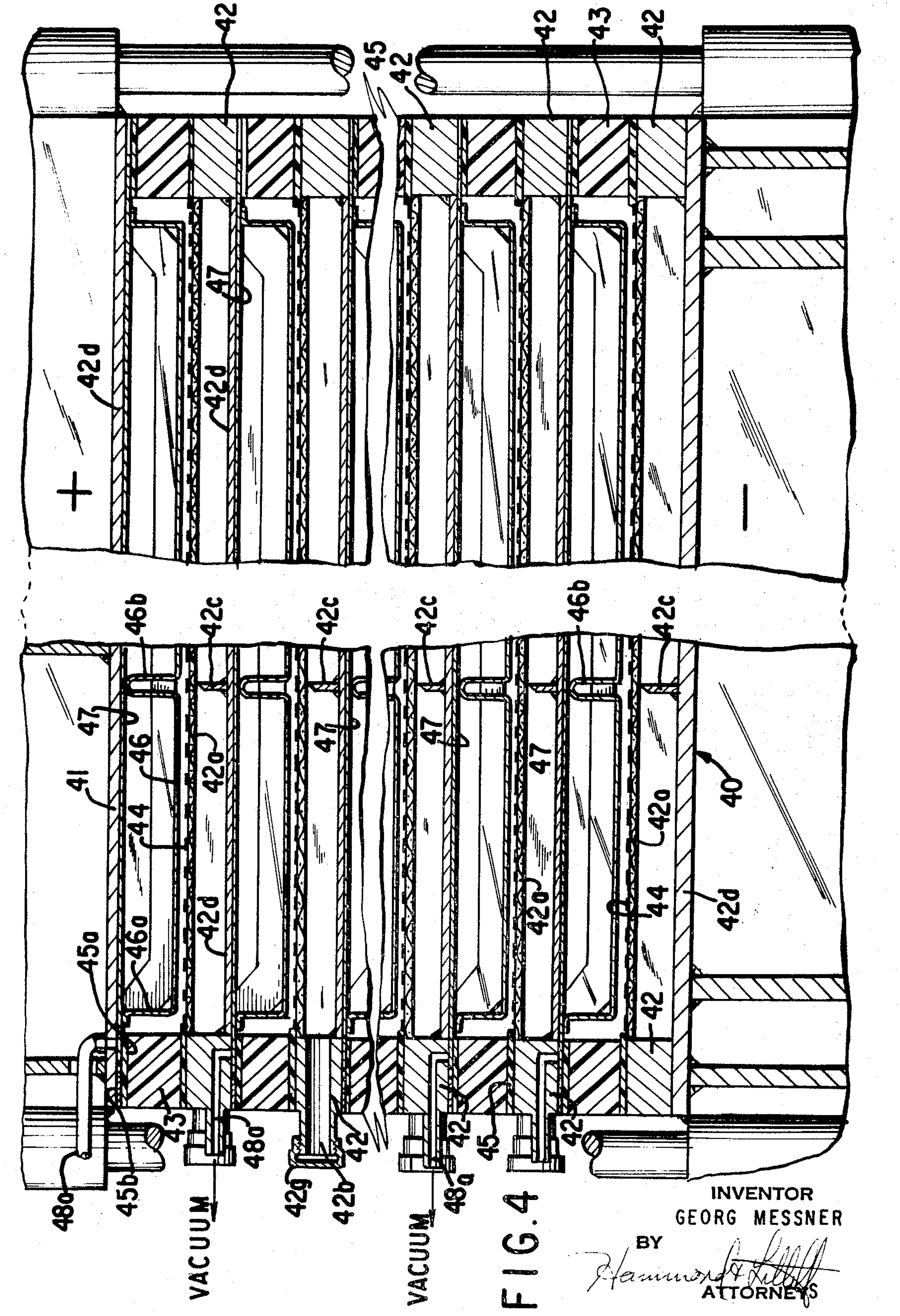
FIG. 4 is a partial transverse section through the said stacked cell of FIG. 3.

FIGS. 3 and 4 illustrate a horizontal, planar, bipolar diaphragm cell with insulated anode frames stacked on metal cathode frames provided with a cathode screen and a diaphragm wherein the electrical contacts between the anode back plates and cathode bottom plates are maintained by a vacuum.

The embodiment of the horizontal, planar, bipolar cell illustrated in FIGS. 3 and 4 shows a plurality of individual cell units mounted on a steel bottom plate 40 to which the negative connection to the electrical circuit is made and a steel top plate 41 with steel reinforcing ribs 41*a* to which the positive bus bar is connected, with the bipolar cell units mounted between the bottom plate 40 and top plate 41.

Each cell unit is comprised of a rectangular steel frame 42 constituting the enclosure for the cathode compartment and an insulating rectangular anode frame member 43 of glass fiber reinforced polyester, polyvinyl chloride (PVC) or other suitable insulating material constituting the anode compartment. A steel cathode screen 42*a* is spot welded at several places to the upper inner corner of each cathode frame 42, and each cathode screen is adapted to support a diaphragm 44 (shown in dash lines in FIGS. 3 and 4), which may be a woven sheet of asbestos cloth or other suitable diaphragm material or an asbestos fiber diaphragm applied by suction to the cathode screens 42. Suction nozzles 42*b* (FIG. 4) are provided in frames 42 for the initial deposit of diaphragm material on the cathode screens 42*a*. The lower face of each of the cathode screens is supported on steel ribs 42*c* which are welded to the steel bottom plate 42*d* of each cathode frame and tack welded to the cathode screens 42*a*, to support the screens and provide good electrical connection between the cathode screens and the cathode frame bottom plates.

A rubber gasket 45 (FIG. 4) rests upon the top of each cathode frame 42 and provides spacing between the steel cathode frames 42 and the insulating polyester anode frames 43.

The anodes 46 are formed of thin sheets (approximately 0.060 inch) of a valve metal resistant to the cell conditions, such as titanium or tantalum or alloys of titanium or tantalum having a conductive electrocatalytic coating containing a mixture of oxides of titanium or tantalum and oxides of a platinum group metal or oxides of other metals or covered with a platinum group metal in metallic form. The anodes 46 may be in the form of mesh, screen, rods or the like and may be coated on either or both the front and back faces of the anode with said electrically conducting electrocatalytic coating. The active faces of anodes 46 are spaced about 6 to 10 mm above the cathode screens 42*a* and diaphragms 44, and extend into the anolyte liquor for a suitable distance to provide efficient electrolysis of the anolyte liquor in the elctrode gap between the anode faces and the cathode screens 42*a*.

The anodes 46 are suspended in the anode frames 43 from a titanium (or tantalum) back plate 47 which rests against the cathode bottom plates 42*d* of the next higher cathode element and are held in electrical contact with the back plates 42*d* by a vacuum, imparted to the space between the bottom plates 42*d* and the back plates 47 by means of suction connections 48*a* which extend into the space between each steel bottom plate 42*d* and titanium back plates 47. To improve the electric contact, the contact face of the bottom plates 42*d* and the titanium back plates 47 are, at least, partially sandblasted and covered with a sprayed thin layer of a soft metal such as copper, lead and the like.

Suction nozzles 42*b* are provided in each cathode frame 42 to facilitate the deposition of diaphragm material indicated by dash lines 44 in FIGS. 3 and 4 on the cathode screens 42*a*. When not in use for diaphragm deposition, the suction nozzles 42*b* are closed by caps 42*g*. With the horizontal, planar cathode screens 42*a*, however, woven asbestos diaphragm cloth may be used in place of suction depositied diaphragms.

The titanium back plates 47 rest against smaller gaskets 45*b* on the top of gaskets 45*a* on the polyester frames 43. Gaskets 45*b* provide spacing for the back plates 47. The anodes 46 are secured to the back plates 47 by legs 46*a* tack welded to the back plates 46 and by integral (or separate) inverted U-shaped legs 46*b* (FIG. 4), also welded to the back plates 47 to make an electrical contact with the back plates so that the electric current flows into the cell stack from the positive terminals through each cell unit in the stack and to the negative terminals connected to the bottom plate 40.

Brine flows into the anode chamber in the anode frames 43 from a brine feed line 49 and a series of branches 49*a* and discharges in a plurality of streams onto a balcony 50 located toward the bottom of each anode frame 43 and extending along one side of each anode frame 43 (see FIG. 3). From the balcony 50, the brine flows into the anodic chambers 45*c* through a series of brine feed holes 50a and fills the anode chambers 54*c* to the level of the top of overflow lips 50*b*. Sufficient brine is fed into the cell stack to maintain the brine level above the active faces of the anodes 46 in all the anode chambers and provide a slight excess which flows out through the brine outlet opening 49*a* at the bottom of the cell stack. The excess of brine flowing onto the balconies 50 overflows the lips 50*b*, provided with semi-circular notches 50*c* and flows downward through a hole in a polyester insert 51 which occupies a space in the cell stack adjacent the end of each cathode frame 42 on the brine feed inlet side. As shown in FIG. 3, the steel cathode frames 42 are shorter than the anode frames 43 and the polyester inserts 51 occupy the space at the ends of the cathode frames adjacent the brine inlet end of the cell units. Each insert 51 has a deflector ledge 51*a* which deflects the downwardly flowing brine stream onto the next lower balcony 50 in the cell stack, so that each anode chamber in the stack is fed with the correct amount of brine and the excess brine flows out of the brine exit line 49*b*. A sight glass in the exit line 49*b* enables the operator to observe the brine flow from the cell stack and to regulate the rate of brine feed to provide the desired excess flow.

Figure 5:
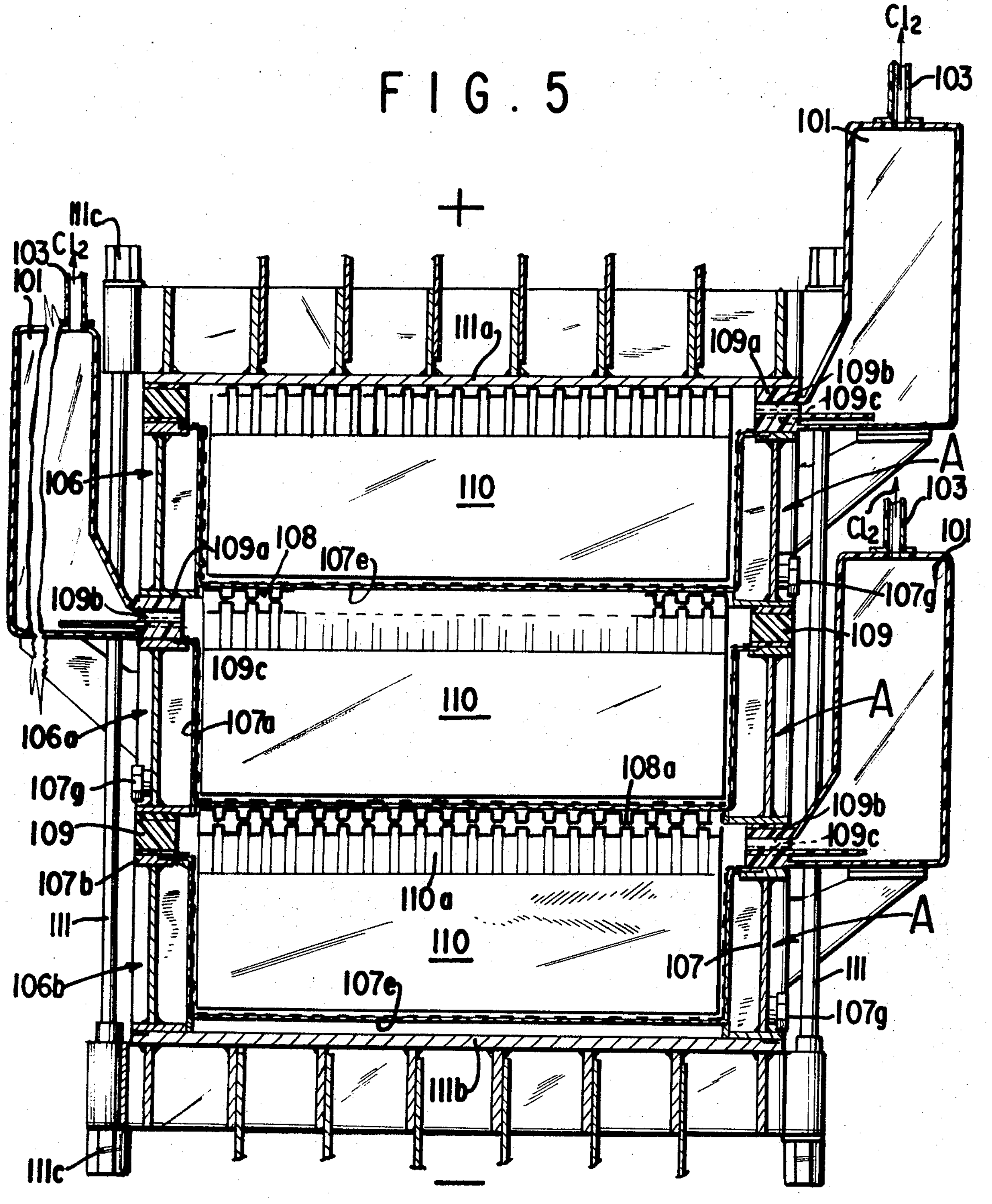
FIG. 5 is a longitudinal sectional view of a three unit bipolar diaphragm cell with dimensionally stable blade anodes and cathodes in horizontal wave form.

In the embodiment illustrated in FIGS. 5, 6 and 6*a*, a bipolar cell stack consisting of three stacked bipolar cell units A, A, A, is shown. The bipolar cells of this invention may contain twenty or more cell units. Brine is fed into the anode compartment of each cell unit A through one side of a glass fiber reinforced polyester or PVC insulating frame 109 from polyester brine containers 101 mounted alternately on each side of the cell stack. Brine is fed to each of the brine containers 101 from brine inlet lines, fed from a common brine feed pipe with controlled feeding by means of valve and flow meters (not shown), and is fed from the brine containers 101 into the individual anodic compartments of cell units A, A and A. In operation, chlorine produced in each cell unit A flows into the connected brine container 101 where it bubbles through the brine and escapes from the brine containers 101 through outlets 103 and into a common chlorine header which is connected with the chlorine recovery system. Hydrogen produced in the cathode compartment flows through hydrogen outlets (not shown) and into hydrogen discharge line, leading to the hydrogen recovery system, and catholyte liquor (NaOH) produced in the cathode compartment flows through the catholyte outlets 107*g* to the catholyte recovery system.

Referring now to FIG. 5, each cell unit 106, 106*a*, 106*b*, etc., consists of a ferrous metal (steel) cathode frame 107 in which the cathode screen 107*a* is mounted horizontally in wave form. The cathode screen waves 107*a* are welded to the frame 107 around the inner perimeter of its flange 107*b* and the trough of each wave of the cathode screen is welded at 107*c* to a thin steel bottom plate 108 having approximately rectangular corrugations or bumps 108*a* therein, running at right angles to the waves. A rectangular insulating anode frame 109 of glass fiber reinforced polyester, polyvinyl chloride, or similar insulating material is mounted on the top of each flange 107*b* and on the sides 109*a* where the brine containers 101 are mounted, the polyester side frames are provided with a row of large holes 109*b* (FIG. 5) for the discharge of chlorine gas from the anodic compartments into the brine containers 101 and a row of smaller holes 109*c* through which brine is fed from the polyester brine containers 101 into the anode compartment of each cell unit.

The brine from containers 101 is fed into the anodic compartments and the brine level in the anodic compartments is maintained at the level necessary to maintain the desired flow through the diaphragms 107*e* on cathode waves 107*a*. The permeability of these diaphragms gradually lessens the longer the diaphragm is used, so that the brine level in the anode compartments (shown by sight glasses in each brine container 101) rises continually during the life of the diaphragms. By maintaining a brine feed to each container 101 adjusted for the production of an essentially constant caustic concentration in the catholyte liquor, the decrease in permeability of the diaphragms is compensated for. The space above the brine level in the anodic compartments is occupied by chlorine gas which flows through the larger holes 109*b* in the sides 109*a* of the polyester frames 109 and flows upwardly through the brine in containers 101 and through the chlorine outlets 103 to the chlorine recovery system.

In the anodic compartments, the valve metal anodes 110 in horizontal double or single blade form extend nearly from end to end and side to side of the cathode frames 107 and are fitted between each of the cathode waves 107*a* and each anode blade 110 is welded, bolted or otherwise secured to titanium connecting strips 110*a* which are welded or otherwise secured to a corrugated titanium back plate 110*b* whose corrugations or bumps make contact with the corrugations 108*a* of the steel cathode bottom plate. While the anodes 110 have been described as in single or double blades in wave form, it will be understood that single blades of titanium coated with an electrically conducting electrocatalytic coating may be used, with each blade fitting between the cathode waves 107*a*. The ends 110*c* of the back plates 110*b* fit between the tops of the polyester frames 109 and the bottom flanges of the next higher cathode frame 107, suitable gaskets being provided to make these joints liquid and gas tight. The ends 107*d* of the cathode screens 107*a* fit between the top of flanges 107*b* of the cathode frames 107 and the next higher polyester frame 109 and suitable gaskets are provided to make these joints fluid-tight. The cathode screen waves 107*a* are provided with diaphragms by depositing asbestos fiber or other diaphragm material 107*e*, shown in dash lines in FIG. 6, on the cathode screens by means of suction nozzles 107*f*, provided in each cathode frame for that purpose.

The cell units A, A, A, etc. are held together by nuts 111*c* on a series of long bolts 111 extending from the top plate 111*a* to the bottom plate 111*b* (FIG. 5) and positive and negative electrical connections are made with the top and bottom plates. The bipolar connection between each cell unit A and the next lower cell unit is made by a vacuum maintained contact between the bottoms of corrugations or bumps 108*a* in the steel plates and the tops of corrugations or bumps in the titanium back plates 110*b*. The corrugated titanium back plates 110*b* are approximately 1.5 mm thick and the corrugated steel plates 108 are approximately 1 to 2 mm thick, so that there is a certain flexibility in these plates. The corrugations of the top titanium back plate 110*b* make contact with the top plate 111a and the corrugations 108*a* of the bottom steel base plates make contact with the bottom plate 111*b*, which contacts are maintained by the vacuum in the squared tubes 112 (FIG. 6*a*), which communicate through openings 112*a* with the rectangular corrugations in the steel bottom plates 108.

Prior to assembly, the contact faces of the corrugations are sandblasted and covered with a film of sprayed soft metal such as copper, silver, lead, tin, zinc, cadmium or alloys thereof.

The long bolts 111 hold the cell elements together, but during operation of the bipolar cell a vacuum is applied to the space between the steel and titanium plates 108 and 110*b* by means of square tubes 112 which communicate with the space between these contact plates and with vacuum lines 112*b* (FIG. 6*a*) connected to a vacuum pump system (now shown). Suitable gaskets around the perimeter of the corrugated anodic and cathodic plates seal the edges of these plates and permit maintaining the vacuum bipolar connection with little expenditure of power. A vacuum of approximately 700 mm of mercury is usually sufficient for this purpose. A squared tube 112*c* on the side opposite vacuum tube 112 communicates with the bottom of each cathode compartment and with drain lines 112*d* and drain valves 112*e*, so that each of the catholyte compartments can be drained during shutdowns.

The vacuum between the corrugated titanium back plates 110*b* and the corrugated steel plates 108, plus the hydraulic pressure on the opposite sides of these plates, maintains a firm electronic contact between these plates which, nevertheless, can be readily broken, by breaking the vacuum, so that the anode — cathode assembly shown in FIGS. 5, 6 and 6*a* can be easily disassembled and reassembled when necessary.

FIGS. 7 and 8 illustrate the use of the vacuum maintained electrical contact between the anodes and cathodes of a bipolar chlorate cell, made up of a plurality of bipolar cell elements 113 between an anodic end electrode 114 and a cathodic end electrode 115 connected to current bus bars 114*a* and 115*a*, respectively. Each bipolar element is comprised of a plurality of parallel steel cathodes 116 attached to steel cathode end plates 118 and a set of parallel titanium anodes 117 attached to a titanium anode end plate 119. The cell elements are held together by end plates 120 and 121 connected by long bolts 122, which, however, are not relied upon to maintain the electrical connection between the bipolar anode — cathode elements. The sodium chloride brine is introduced into the bottom of each cell unit through elbowed pipes 123 and hydrogen gas and the partially electrolyzed brine from which sodium chlorate can be recovered are taken from the top of each cell unit by pipes 124 with make-up brine being added by line 125. FIG. 8 shows on the right side, the nest of anode plates 117 and on the left side, the nest of double cathode blades 116. This view corresponds to the bipolar connection between cell units B and C in FIG. 7.

The back side of anode end plate 119 of one cell unit is in contact with the back side of cathode end plate 118 of the adjacent cell and optimum electrical contact is maintainied by applying a vacuum to the space between them through bore 126. This avoids the expense involved in bolting and unbolting the individual cell units when assembling and disassembling the electrolyzer, and maintains good electrical contact between the anode and cathode end plates while still allowing for expansion and contraction or creep between the dissimilar metals.

The anode end plates 119 and the cathode end plates 118 are provided with rectangular corrugations or bumps 119*a* and 118*c*, shown in FIG. 9 and similar to the corrugations 108*a* and 110*b* illustrated in FIGS. 6 and 6*a*, and the meeting faces are covered with a soft conducting metal such as lead, tin, zinc, cadmium, copper, silver, etc. and alloys thereof. The problem of destruction of the titanium parts by formation of titanium hydride due to hydrogen migration is overcome by coating the back sides of anode plates 119 and cathode plates 118 with a layer of a soft metal such as copper, lead or tin, etc., in which the solubility of hydrogen is very low. This three-phase connection eliminates hydrogen migration from the steel cathode plate 118 to the titanium anode plate 119 and optimum metal contact is obtained by the plastic deformation of the soft metal by the pressure created by the vacuum. The vacuum sucks out any hydrogen from between the plates 118 and 119. The amount of vacuum necessary to maintain good electrical contact or connection between the vacuum connected parts is relatively small. It may be as low as 0.1 atmospheres, but is preferably between 700 and 760 mm of mercury.

In the several modifications of a vacuum maintained electrical connection illustrated in FIGS. 1 to 9 only so much of the electrolysis cell as is necessary to understand the principles and designs of the vacuum maintained electrical connection have been described. Various other modifications of the electrical connection of the invention may be made without departing from the spirit of this invention or scope thereof and it is to be understood that the invention is to be limited only as defined in the appended claims.

What is claimed is:

1. In a bipolar electrolyzer, an anode end unit, a plurality of cell units containing an anode and a cathode spaced apart and a cathode end unit, and anode in one cell unit and a cathode in an adjacent cell unit, made of dissimilar metals, being held in electrical contact with each other by maintaining a vacuum between said anode and cathode in adjacent cell units.

2. The electrolyzer of claim 1, in which one of said dissimilar metals is a ferrous metal and the other of said metals is a valve metal.

3. The bipolar electrolyzer of claim 1, in which at least one diaphragm is used between the active face of the cathode and the active face of the anode in the same cell unit.

4. The bipolar electrolyzer of claim 1, in which a plurality of anodes and cathodes are held in electrical contact with each other, the terminal anode is connected to the positive pole of a power source and the terminal cathode element is connected to the negative pole of the power source.

5. In a horizontal mercury cell comprising a conductive cell bottom, side walls, a mercury cathode flowing along the cell bottom, a cover and dimensionally stable anodes spaced a short distance from the mercury cathode and means for passing an electrolysis current through the cell, the improvement comprising a metal sheet on the cell bottom and held in electrical contact therewith by vacuum.

6. In the horizontal mercury cell of claim 5, the further improvement comprising a metal cover and a valve metal sheet on the inner side of said cover held in electrical contact therewith by a vacuum and the anodes being connected to the said valve metal sheet.

7. In a bipolar chlorate electrolyzer comprised of a plurality of cell units having a plurality of parallel, interleaved anodes attached to an anode plate and a plurality of cathodes leaves attached to a cathode plate and the anode plate of one cell unit in electrical contact with the cathode plate of the adjacent cell unit, the improvement comprising applying a vacuum to the contact surfaces of the anode plate of one cell unit and the cathode plate of the adjacent cell unit to obtain optimum electrical contact.

8. In a bipolar chlorate electrolyzer of claim 7, the added improvement comprising a layer of a deformable metal between the contact surfaces of the anode plate of one cell unit and the cathode plate of the adjacent cell unit whereby hydrogen migration from the cathode plate to the anode plate is prevented.

9. In the bipolar chlorate electrolyzer of claim 8, the deformable metal is selected from the group consisting of lead, copper, tin, zinc, cadmium and silver and alloys thereof.

* * * * *